United States Patent
Waldschütz et al.

(10) Patent No.: US 12,444,809 B2
(45) Date of Patent: Oct. 14, 2025

(54) APPARATUS FOR CONNECTING IN PARALLEL A PLURALITY OF BATTERY CELLS WHICH ARE ARRANGED PARALLEL TO ONE ANOTHER WITH RESPECT TO A JOINING AXIS

(71) Applicant: John Deere Electric Powertrain LLC, Moline, IL (US)

(72) Inventors: Gerhard Waldschütz, Freistadt (AT); Wolfgang Schmudermaier, Eisgarn (AT); Florian Drexler, Freistadt (AT); Helmut Kastler, Freistadt (AT)

(*) Notice: Subject to any disclaimer, the term of this patent is extended or adjusted under 35 U.S.C. 154(b) by 714 days.

(21) Appl. No.: 17/437,161

(22) PCT Filed: Feb. 25, 2020

(86) PCT No.: PCT/AT2020/060054
§ 371 (c)(1),
(2) Date: Sep. 8, 2021

(87) PCT Pub. No.: WO2020/181308
PCT Pub. Date: Sep. 17, 2020

(65) Prior Publication Data
US 2022/0173483 A1  Jun. 2, 2022

(30) Foreign Application Priority Data
Mar. 8, 2019 (AT) .............. A 50188/2019

(51) Int. Cl.
*H01M 50/503* (2021.01)
*H01M 50/50* (2021.01)
(Continued)

(52) U.S. Cl.
CPC ......... *H01M 50/503* (2021.01); *H01M 50/50* (2021.01); *H01M 50/512* (2021.01); *H01M 50/524* (2021.01); *H01M 50/526* (2021.01)

(58) Field of Classification Search
CPC ........ H01M 6/42; H01M 10/02; H01M 10/04; H01M 50/50; H01M 50/503;
(Continued)

(56) References Cited

U.S. PATENT DOCUMENTS 6,120,564 A   9/2000 Marukawa et al.
9,331,315 B1  5/2016 Goulden
(Continued)

FOREIGN PATENT DOCUMENTS

CN   101719540 A   6/2010
EP     1914820 A1   4/2008
(Continued)

OTHER PUBLICATIONS

English language espacenet Abstract for JP2001-185102 A, Jul. 6, 2001.
(Continued)

*Primary Examiner* — Matthew T Martin
*Assistant Examiner* — Jared Hansen
(74) *Attorney, Agent, or Firm* — Tiajoloff & Kelly LLP

(57) ABSTRACT

A device is described for connecting in parallel multiple battery cells (2) arranged in parallel to one another with respect to a joining axis using a contact plate (1) having individual passages (3). To enable a connection in parallel, which is reliable under periodic mechanical strains and nonetheless detachable, of individual battery cells (2) independently of their diameter and their relative location to the contact plate (1), wherein a simple assembling procedure can be maintained and a more flexibly designed serial interconnection of the battery cells can be enabled, it is proposed that each passage (3) is designed for the jacket-side enclosure of the battery cells (2) and comprises at least one contact tongue (4), which has on the passage side a
(Continued)

Figure 1:
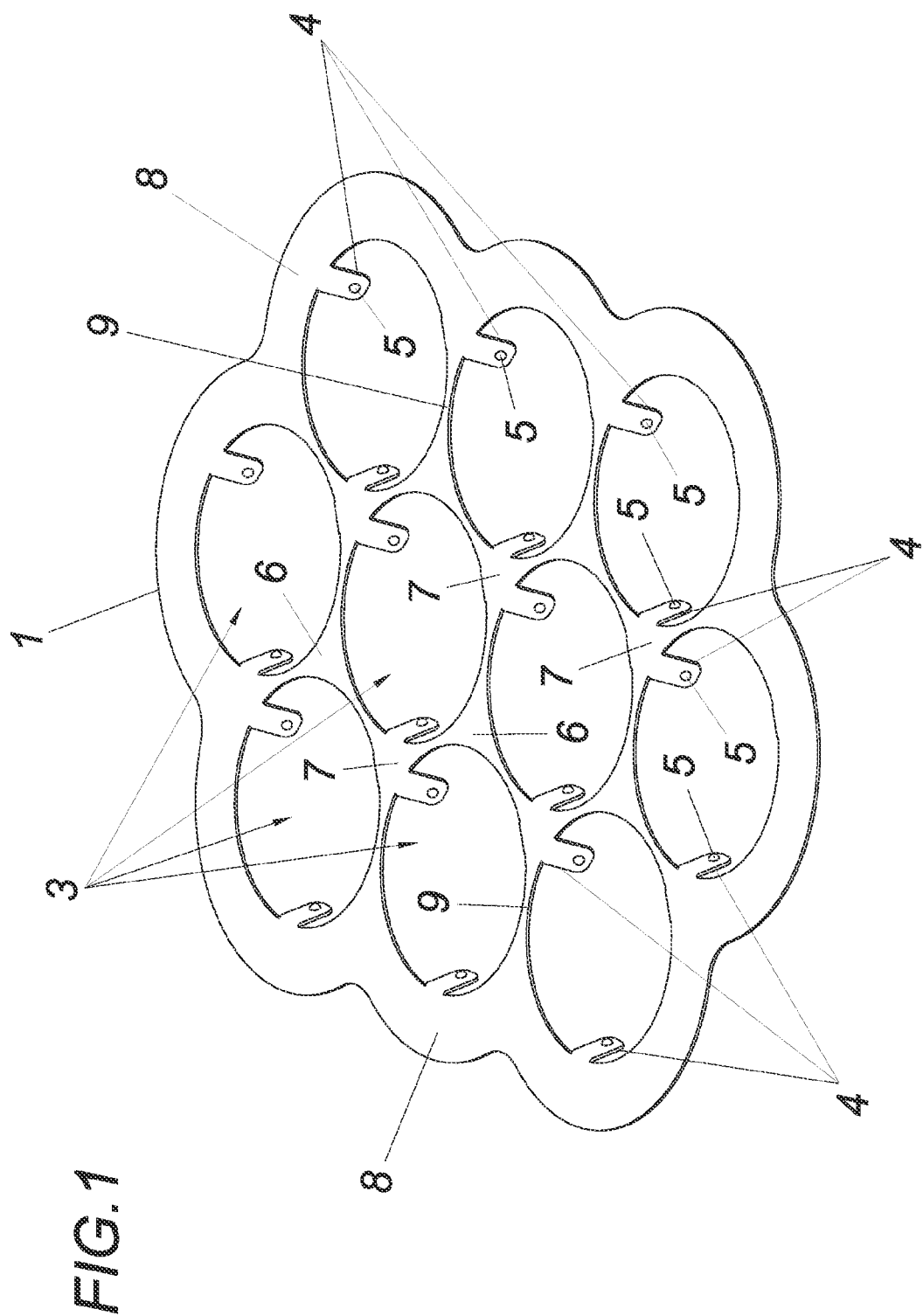

contact body (5) protruding from the contact tongue (4) into the passage (3) in the form of a cut ovoid.

23 Claims, 3 Drawing Sheets

(51) Int. Cl.
*H01M 50/512* (2021.01)
*H01M 50/524* (2021.01)
*H01M 50/526* (2021.01)

(58) Field of Classification Search
CPC ............. H01M 50/512; H01M 50/524; H01M 50/526; H01M 2220/20; Y02E 60/10; Y02P 70/50

See application file for complete search history.

(56) References Cited

U.S. PATENT DOCUMENTS

| | | |
|---|---|---|
| 2003/0193313 A1 | 10/2003 | Takedomi et al. |
| 2005/0070164 A1 | 3/2005 | Mita et al. |
| 2008/0186162 A1 | 7/2008 | Kim et al. |
| 2009/0104516 A1 | 4/2009 | Yoshihara et al. |
| 2009/0208837 A1 | 8/2009 | Lin |
| 2010/0099024 A1 | 4/2010 | Kim et al. |
| 2011/0104958 A1* | 5/2011 | Kwon ................ H01R 13/2464 439/816 |
| 2016/0285143 A1 | 9/2016 | Rief et al. |
| 2020/0028132 A1* | 1/2020 | Muratsu .............. H01M 50/213 |
| 2021/0399386 A1* | 12/2021 | Faltermeier ......... H01M 50/213 |

FOREIGN PATENT DOCUMENTS

| | | |
|---|---|---|
| EP | 1953849 A1 | 8/2008 |
| EP | 2048723 A1 | 4/2009 |
| EP | 2087554 | 8/2009 |
| EP | 3096372 A1 | 11/2016 |
| JP | 2001-185102 A | 7/2001 |
| JP | 2003-077453 A | 3/2003 |
| WO | 2008/062951 A1 | 5/2008 |
| WO | 2020/181307 A1 | 9/2020 |

OTHER PUBLICATIONS

English language espacenet Abstract for JP2003-077453 A, Mar. 14, 2003.

English language espacenet Abstract for CN101719540A, Jun. 2, 2010.

* cited by examiner

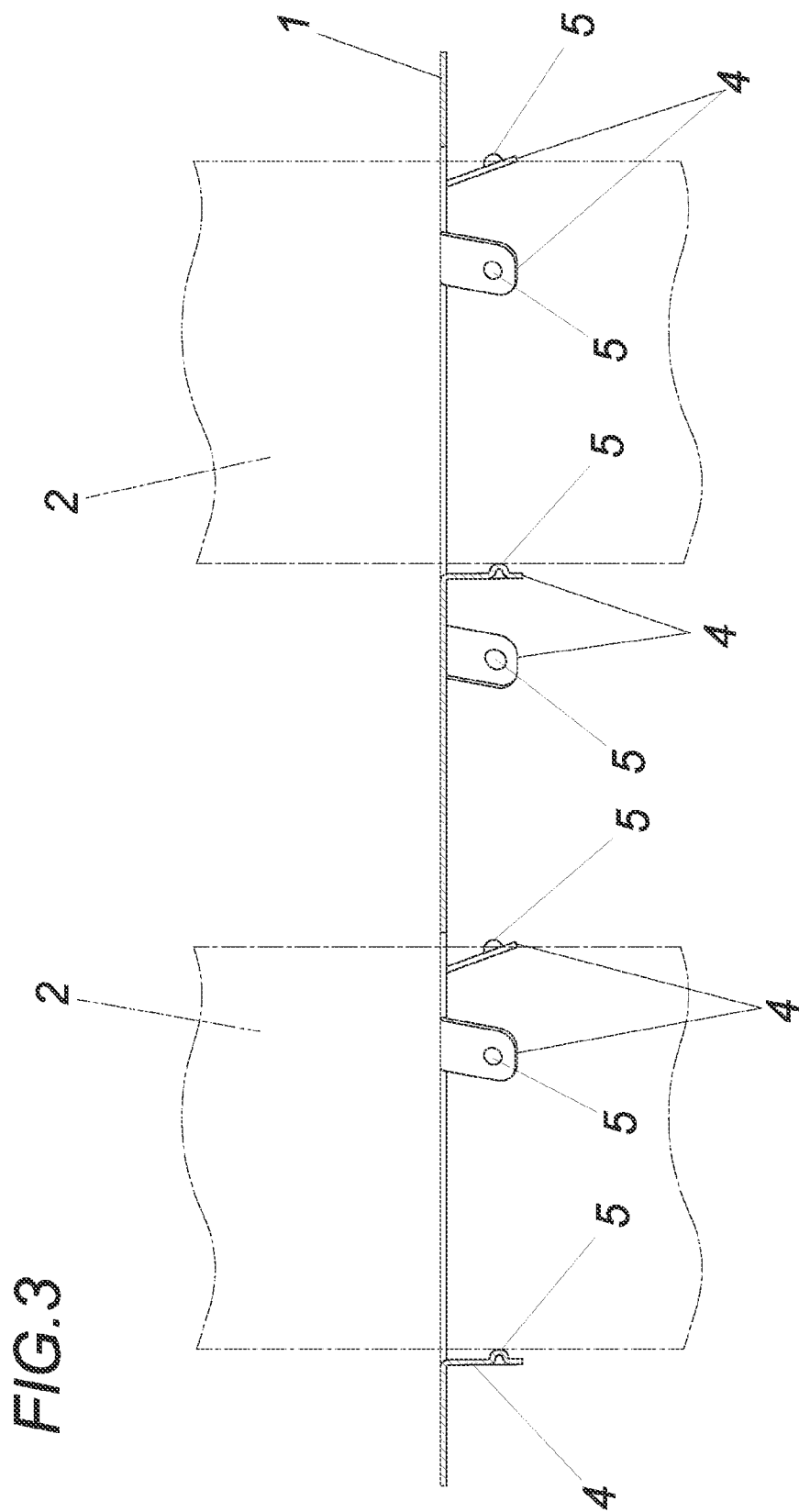

APPARATUS FOR CONNECTING IN PARALLEL A PLURALITY OF BATTERY CELLS WHICH ARE ARRANGED PARALLEL TO ONE ANOTHER WITH RESPECT TO A JOINING AXIS

TECHNICAL AREA

The invention relates to a device for connecting in parallel multiple battery cells arranged in parallel to one another with respect to a joining axis using a contact plate having individual passages.

PRIOR ART

Devices for connecting battery cells in parallel are known from the prior art (EP3096372A1), in which individual battery cells arranged in parallel with respect to a joining axis are enclosed on the jacket side by contact springs under pre-tension. To connect the individual battery cells in parallel, the contact springs are connected in a materially bonded manner to a contact plate. Although this detachable, friction-locked connection between the battery cells and the contact springs is accompanied by easy assembly and exchangeability of defective battery cells, the disadvantage nonetheless results that the clamping forces required for reliable electrical and mechanical contacting of the battery cells make the assembly procedure more difficult insofar as damage to the battery cell jacket and/or the oxidation-preventing coating of the contact springs occurs during the joining of the battery cells in the contact springs. Constructive restrictions with respect to the possible battery cell diameter and thus the usable power density result therefrom, in particular for the case in which the battery cells and thus the contact springs are subjected to mechanical stresses, for example, oscillations, which, with the typical sharp-edged design of the contact tongues, results in successive damage to the battery cell jacket and/or the oxidation-preventing coating of the contact springs. In addition, due to the varying contact areas between the contact tongues and the battery cell jacket, a variable contact resistance results, which is accompanied by unfavorable electrical operating conditions. For this reason, materially bonded connections between the contact springs and the battery cells are typically preferred.

Therefore, to also achieve a materially bonded connection at contact points which are difficult to access, it has already been proposed (U.S. Pat. No. 6,120,564, EP2007833442) that spot welds be provided on the contact springs, which enable a materially bonded connection upon application of a correspondingly high current. However, this has the disadvantage in a comprehensible manner that, neglecting the restrictions in the assembly and the lack of exchangeability of defective battery cells, the currents and temperatures occurring during the welding can result in damage to the battery cells.

DESCRIPTION OF THE INVENTION

The invention is therefore based on the object of designing a device of the type described at the outset so that a connection in parallel, which is reliable under periodic mechanical strains and is nonetheless detachable, of individual battery cells is enabled independently of their diameter and their relative location to the contact plate, wherein a simple assembly procedure is maintained and a more flexibly designed serial interconnection of the battery cells can be enabled.

The invention achieves the stated object in that each passage is designed for the jacket-side enclosure of the battery cells and comprises at least one contact tongue which has on the passage side a contact body protruding from the contact tongue into the passage in the form of a cut ovoid. In contrast to a contact spring known from the prior art, which would have an undefinable contact surface with the battery cell enclosed by the passage depending on the relative location, due to the provision according to the invention of a contact body in the form of a cut ovoid, preferably in the form of a hemisphere, the contact surface between the contact spring and the jacket is specified, so that a defined contact resistance results between the contact body or the contact spring and the battery cell. This contact resistance is substantially constant even in the event of a mechanical deformation of the device as a result of vibrations. Due to the convex surface of the contact body, in addition surface damage can be avoided, particularly the contact body can separate the sharp-edged contact tongues from the respective surface jacket of the battery cells. The design of the invention furthermore offers the advantage that the contact plate can be arranged at any position along the joining and longitudinal axis of the battery cells, so that greater design options result with respect to the serial interconnection of the individual battery cells. In an embodiment favorable for manufacturing, the contact tongues can be sections of the contact plate bent in the direction of the joining axis of the battery cells. This means that for better electrical conductivity of the device, contact plate and contact tongues can be formed from a single piece of metal.

To improve the electrical contact with simple production conditions at the same time, it is furthermore proposed that the contact body are pressed out of the contact tongues. The contact bodies can thus be produced in one work step, wherein the rounded surface to avoid surface damage can be achieved without separate postprocessing. To reduce the surface contamination resistance, the contact bodies can be provided with an oxidation-preventing coating. Such a coating can be produced in one particularly advantageous embodiment of the invention in that the contact tongues are already provided with a coating thickness sufficient for a person skilled in the art before the pressing of the contact bodies, so that after the forming, the contact body surfaces projecting into the passages have a closed oxidation-preventing coating. For example, nickel or gold can be used as coatings as an oxidation protection to reduce the surface contamination resistance.

Since power to weight ratios and energy densities play a large role in particular in vehicle design, it is proposed that the circular passages of the contact plate are arranged according to a densest circle packing with formation of spandrels lying between each three passages. It is obvious here to a person skilled in the art that a densest circle packing of passages in the meaning of the invention requires that a connecting web remain between the individual battery cells or passages, the width of which is to be adapted to the material properties and the required mechanical stability. As a result of the proposed design, a reinforced contact plate section results at the spandrels resulting between each three passages, which can be used to introduce clamping forces into the contact plate and is preferably suitable for positioning the contact tongues due to its structural strength. The mechanical pre-tension and location of the contact tongues may thus also be adapted depending on the battery type used, since the contact point between contact tongue and conduction plate can be selected in a spatially freer manner. To clamp the battery cells in a friction-locked and symmetrical manner with the contact plate, at least two, preferably at least three contact tongues arranged circumferentially equidistant to one another can be provided per passage. The stabilizing clamping force on the battery is thus increased, the symmetrical friction lock reduces the mechanical tension between battery modules and contact plate, and a friction-locked mounting is enabled even upon damage of individual contact tongues. A further resulting effect is a more durable electrical connection between battery cell jacket and contact plate, since a continuous electrical connection can also be provided here in particular in the case of mechanical damage of a contact tongue.

To achieve a particularly favorable force introduction of the clamping forces into the contact plate, it is proposed that each contact tongue of one passage surrounded by six passages delimits a spandrel which is also delimited by one contact tongue of each of two surrounding passages. The device is stiffened in the direction of the joining axis of the battery modules, thus essentially orthogonally to the plane of the parallel plate, by this arrangement, whereby in addition to improved electrical conduction properties, as a synergy effect due to the increased number of contact tongues per passage, the mechanical stability of the arrangement is increased, particularly the forces of the contact tongues introduced into the contact plate section of a spandrel cancel out vectorially. It is obvious here for a person skilled in the art that this pattern cannot be continued endlessly in a contact plate, so that the passages of edge regions which are not surrounded by six passages no longer have to fulfill the above characterizing feature. A particularly material-saving and manufacturing-efficient embodiment of the device according to the invention results if precisely three contact tongues are provided per passage, wherein in each case three contact tongues adjoin each second spandrel, while the respective first spandrels remain free. Such a sequence pattern can also be created in a particularly simple manner by shifting in parallel a generating passage having three contact springs in the contact plate plane. Depending on need and application, the contact plate can be designed to be more or less elastic or rigid with respect to bending and torsion tensions by the number of the contact tongues per passage.

To further improve the stability of the device according to the invention, it is proposed that the edge region of the contact plate is formed at least five times wider than the narrowest point between two passages.

BRIEF DESCRIPTION OF THE INVENTION

Figure 2:
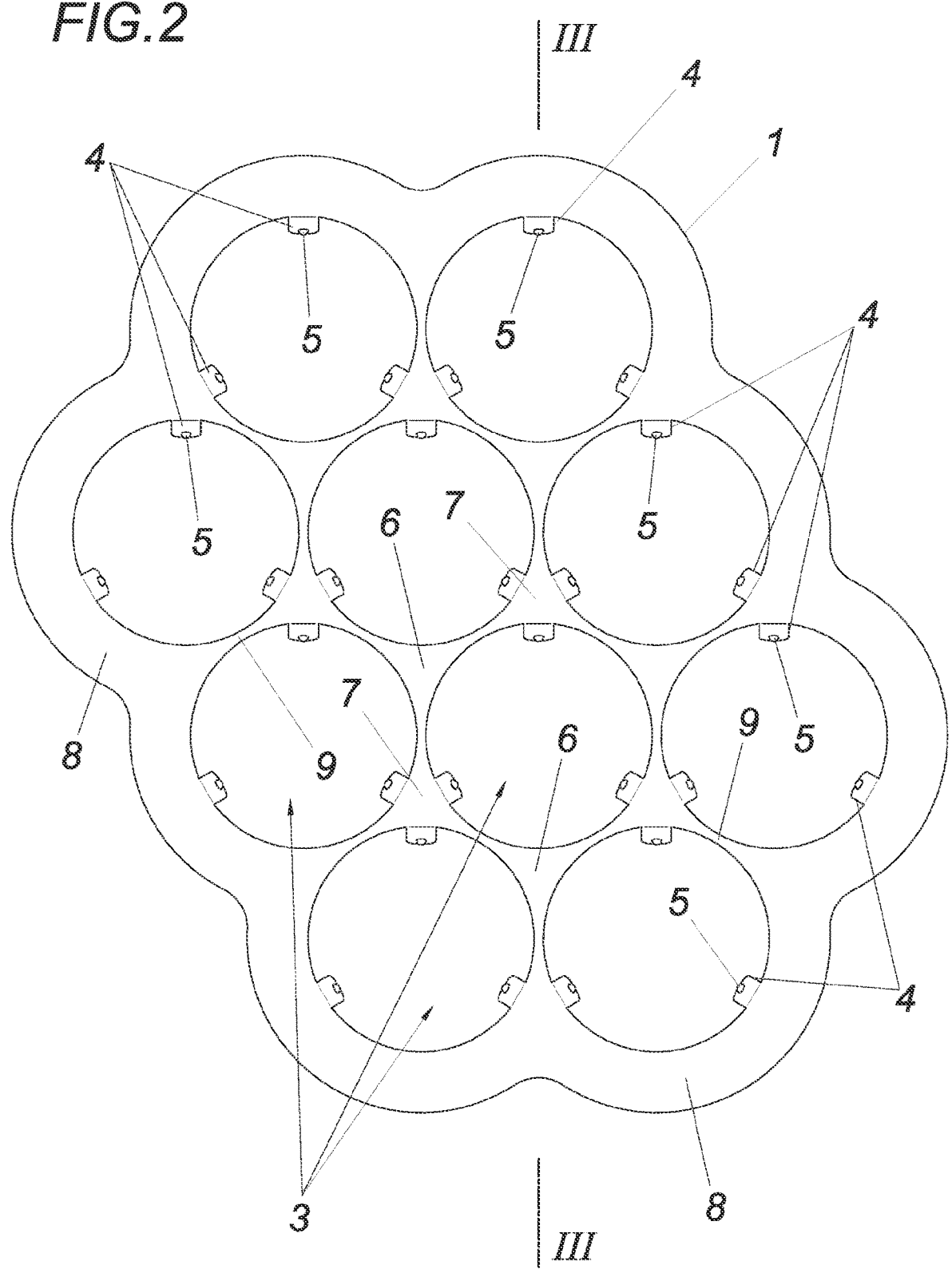

The subject matter of the invention is illustrated as an example in the drawing. In the figures FIG. 1 shows a perspective illustration of the device according to the invention, FIG. 2 shows a top view of the device according to the invention in a larger scale, and FIG. 3 shows a section along line III-III of FIG. 2 in an even larger scale having indicated inserted battery cells.

WAYS OF EMBODYING THE INVENTION

A device according to the invention has a contact plate 1. Battery cells 2 can be mounted in passages 3 in the contact plate 1 and connected in a friction-locked manner and electrically conductively in parallel via contact tongues 4, which have contact bodies 5.

The contact bodies 5 are designed so that under periodic mechanical strain and change of the relative position between contact plate 1 and battery cell 2, the contact area between contact body 5 and battery cell 2 remains substantially constant, which is achieved according to the invention by the design of the contact bodies 5 as cut ovoids, preferably as hemispheres.

The passages 3 of the contact plate 1 are arranged according to a densest circle packing. Together with the arrangement according to the invention of the contact tongues 4, spandrels 6, 7 lying between each three passages 3 thus result. In the case of three contact tongues 4 per passage 3, which are arranged circumferentially equidistant and at an angle of 120° to one another, therefore, on the one hand spandrels 6 result which no contact tongues 4 adjoin and spandrels 7 which contact tongues 4 of the surrounding passages 3 adjoin to form a mechanical stiffening. In the illustrated device, spandrels 6 without contact tongues 4 thus alternate in each case with spandrels 7 with contact tongues 4. The edge region 8 of the contact plate 1 can be formed at least five times as wide as the narrowest point 9 between two passages 3 for stability reasons.

The invention claimed is:

1. A device for connecting in parallel multiple battery cells arranged in parallel to one another with respect to a joining axis, said device comprising:
   a contact plate having individual passages;
   wherein each passage is configured to provide a jacket-side enclosure of the battery cells and at least one contact tongue is associated with each passage;
   wherein each of said contact tongues has a respective contact body on a side of said contact tongue facing the associated passage; and
   said contact bodies each protruding from the respective contact tongue into the passage—and each having a cut ovoid shape that is convex in horizontal and vertical cross sections thereof toward the passage; and
   wherein at least two contact tongues are supported in each of the passages.

2. The device according to claim 1, wherein the contact bodies are pressed out of the contact tongues.

3. The device according to claim 1, wherein the passages of the contact plate are circular and are arranged according to a densest circle packing with formation of spandrels lying between each group of three passages in said dense circle packing.

4. The device according to claim 1, wherein at least three contact tongues arranged circumferentially equidistant to one another around each of the passages.

5. The device according to claim 4, wherein each contact tongue of one of said passages that is surrounded by six of said passages delimits a spandrel that is also delimited by one of the contact tongues of each of two of the surrounding passages.

6. The device according to claim 1, wherein an edge region of the contact plate is formed at least five times wider than a narrowest point between two of said passages.

7. The device according to claim 2, wherein the passages of the contact plate are circular and are arranged according to a densest circle packing with formation of spandrels lying between each group of three passages in said dense circle packing.

8. The device according to claim 2, wherein at least three contact tongues arranged circumferentially equidistant to one another around each of the passages.

9. The device according to claim 3, wherein at least three contact tongues arranged circumferentially equidistant to one another around each of the passages.

10. The device according to claim 7, wherein at least three contact tongues arranged circumferentially equidistant to one another around each of the passages.

11. The device according to claim 8, wherein each contact tongue of one of said passages that is surrounded by six of said passages delimits a spandrel that is also delimited by one of the contact tongues of each of two of the surrounding passages.

12. The device according to claim 9, wherein each contact tongue of one of said passages that is surrounded by six of said passages delimits a spandrel that is also delimited by one of the contact tongues of each of two of the surrounding passages.

13. The device according to claim 10, wherein each contact tongue of one of said passages that is surrounded by six of said passages delimits a spandrel that is also delimited by one of the contact tongues of each of two of the surrounding passages.

14. The device according to claim 2, wherein an edge region of the contact plate is formed at least five times wider than a narrowest point between two of said passages.

15. The device according to claim 3, wherein an edge region of the contact plate is formed at least five times wider than a narrowest point between two of said passages.

16. The device according to claim 4, wherein an edge region of the contact plate is formed at least five times wider than a narrowest point between two of said passages.

17. The device according to claim 5, wherein an edge region of the contact plate is formed at least five times wider than a narrowest point between two of said passages.

18. The device according to claim 7, wherein an edge region of the contact plate is formed at least five times wider than a narrowest point between two of said passages.

19. The device according to claim 11, wherein an edge region of the contact plate is formed at least five times wider than a narrowest point between two of said passages.

20. The device according to claim 13, wherein an edge region of the contact plate is formed at least five times wider than a narrowest point between two of said passages.

21. The device according to claim 1, wherein the cut ovoid shapes of the contact bodies are hemispherical.

22. The device according to claim 1, wherein the contact plate and the contact tongues are formed from a single piece of metal, and the contact tongues are bent in a direction of the joining axis.

23. The device according to claim 1, wherein each of said contact tongues is wider than the respective contact body circumferentially of the passage.

* * * * *